United States Patent [19]

Toman

[11] 4,050,074
[45] Sept. 20, 1977

[54] BLENDED STEP SCAN BEAM SIGNAL FROM FIXED BEAM COMPONENTS

[75] Inventor: Donald J. Toman, Pleasantville, N.Y.
[73] Assignee: Tull Aviation Corporation, Armonk, N.Y.
[21] Appl. No.: 706,020
[22] Filed: July 16, 1976
[51] Int. Cl.² ............................ G01S 1/16; G01S 1/54
[52] U.S. Cl. .............................. 343/106 R; 343/108 M
[58] Field of Search ..................... 343/108 M, 106 R

[56] References Cited

U.S. PATENT DOCUMENTS

| | | | |
|---|---|---|---|
| 3,735,407 | 5/1973 | Meyer | 343/106 R |
| 3,878,523 | 4/1975 | Wild | 343/108 M |
| 3,925,781 | 12/1975 | Hulett et al. | 343/106 R |

Primary Examiner—Maynard R. Wilbur
Assistant Examiner—Richard E. Berger
Attorney, Agent, or Firm—Curtis Ailes

[57] ABSTRACT

Radio frequency energy is rapidly switched from a transmitter in a repeating sequence of bursts of radio frequency energy to the different ones of a plurality of radiation beam ports, and the individual bursts of radio frequency energy are modulated in a predetermined program to provide a composite beam energy profile which is a synthesized directional beam which moves at a predetermined desired scanning rate.

27 Claims, 3 Drawing Figures

BLENDED STEP SCAN BEAM SIGNAL FROM FIXED BEAM COMPONENTS

This invention relates to the production of directional scanning beams of radio energy radiation, usually carried out at microwave frequencies. The invention is particularly useful in the field of aircraft navigation and guidance systems, such as instrument landing systems for guiding aircraft to safe landings.

Scanning directional beams of radio frequency energy are known to be very useful in the field of radio guidance for aircraft. Various scanning beam navigation and guidance systems have been built and have been proposed as standards. One particularly useful mode of utilization of scanning beams, which is a preferred mode for use in conjunction with the present invention, is by reciprocal scanning, including "to" and "fro" scans, and by a measurement of the interval between resultant signals at the receiver as an indication of angular position. This system of scanning is disclosed for instance in connection with FIG. 7 of U.S. Pat. No. 3,757,337 issued Sept. 4, 1973 on an invention by George Lichford entitled "AIRCRAFT INSTRUMENT LANDING SYSTEM". This signal format (including the "to" and "fro" scan) has been proposed for use in a new microwave landing system which is presently under development by the U.S. Federal Aviation Administration of the Department of Transportation. The proposed new system is described in various publications, including a report dated December 1975 entitled "Time Reference Scanning Beam Microwave Landing System" issued by the U.S. Department of Transportation, Federal Aviation Administration and submitted to the International Civil Aviation Organization. This report is hereinafter referred to simply as "the FAA report".

One of the simplest methods for transmitting a scanning beam is to use an antenna which is mechanically moved in an arcuate pattern to provide the scanning signal. However, mechanically movable antenna structures present many problems which are to be avoided if possible. For instance, considerable wear is involved for apparatus which is to be operated on a substantially continuous basis. This results in high maintenance costs, as well as reliability problems. Also, a considerable mechanical energy input is required. Furthermore, rates of scan are often desired which are considerably higher than can be achieved economically with mechanically movable scanning antennas.

Accordingly, it is very desirable to provide the scanning motion of the scanning beam by electrical variation of the radiated signals from fixed antenna elements, rather than by mechanical motion of the antenna elements. Various proposals have been made for achieving this electrical scanning. For instance, one technique which has been proposed to produce a quasi-continuous scanning beam from a beam port antenna is by simultaneously feeding more than one beam port, and, as a function of time, changing the relative energy fed to adjacent ports. This results in a beam which is formed in space with energy contours which scan through space in what amounts to a continuous manner. However this method requires antennas which are of the type which have a common phase center, permitting true vector addition of the energy fields from the different ports.

However, antenna arrays in which the different beam ports have a common phase center are inherently substantially more expensive than antenna arrays which do not have this requirement and limitation. Common phase center antennas also tend to be inefficient. Such antennas rely basically upon microwave optics, and they are thus subject to problems of dimensional stability, particularly in the presence of wide variations in temperature, and over extended periods of time. Thus, the stability problems increase the first cost of the structures and require substantial maintenance in the form of periodic adjustments.

Accordingly, it is an important object of the present invention to provide for the synthesis of continuously scanned radio energy beams from fixed beam components without the requirement for antenna arrays having a common phase center.

Another prior proposal for production of a simulated scanning beam from a stepped beam antenna structure is disclosed in U.S. Pat. No. 3,735,407 issued May 22, 1973 to Maurice A Meyer and entitled "*Stepped Beam Instrument Landing system*". However, the system described in that proposal apparently requires the transmission of elaborate timing signals in conjunction with the transmission of energy from each antenna port, and a rather complicated receiver which is operable to receive and decode the timing signals as well as the arrival times of the stepped beam signals in order to measure an angular bearing with respect to the transmitter.

It is another object of the present invention to overcome the above-mentioned complications of the prior stepped beam instrument landing system, and to provide for the synthesis of continuously scanned beams of radio energy which can be received and processed by a receiver which does not differ substantially from a receiver which may be used for a scanning beam which is transmitted by other means, such as an array having a common phase center, or by a physically movable antenna.

Further objects and advantages of the invention will be apparent from the following description and the accompanying drawings.

The invention may be carried out by a method of synthesizing a continuous scanning beam of radio energy from an array of fixed antenna elements having radiation beam ports aimed radially outwardly to different angles in the arc over which the scanning beam is to be scanned, comprising rapidly switching the radio frequency energy from a transmitter in a repeating sequence of bursts of radio frequency energy to illuminate the different ones of the radiation beam ports at a switching frequency which is substantially greater than the rate of successive interception of the scanning beam to be synthesized with the individual radiation beam port positions, and modulating the energy levels of the individual bursts of radio frequency energy in a predetermined program to provide a composite beam energy profile which is a synthesized directional beam which is moving at a predetermined desired scanning rate.

Figure 1:
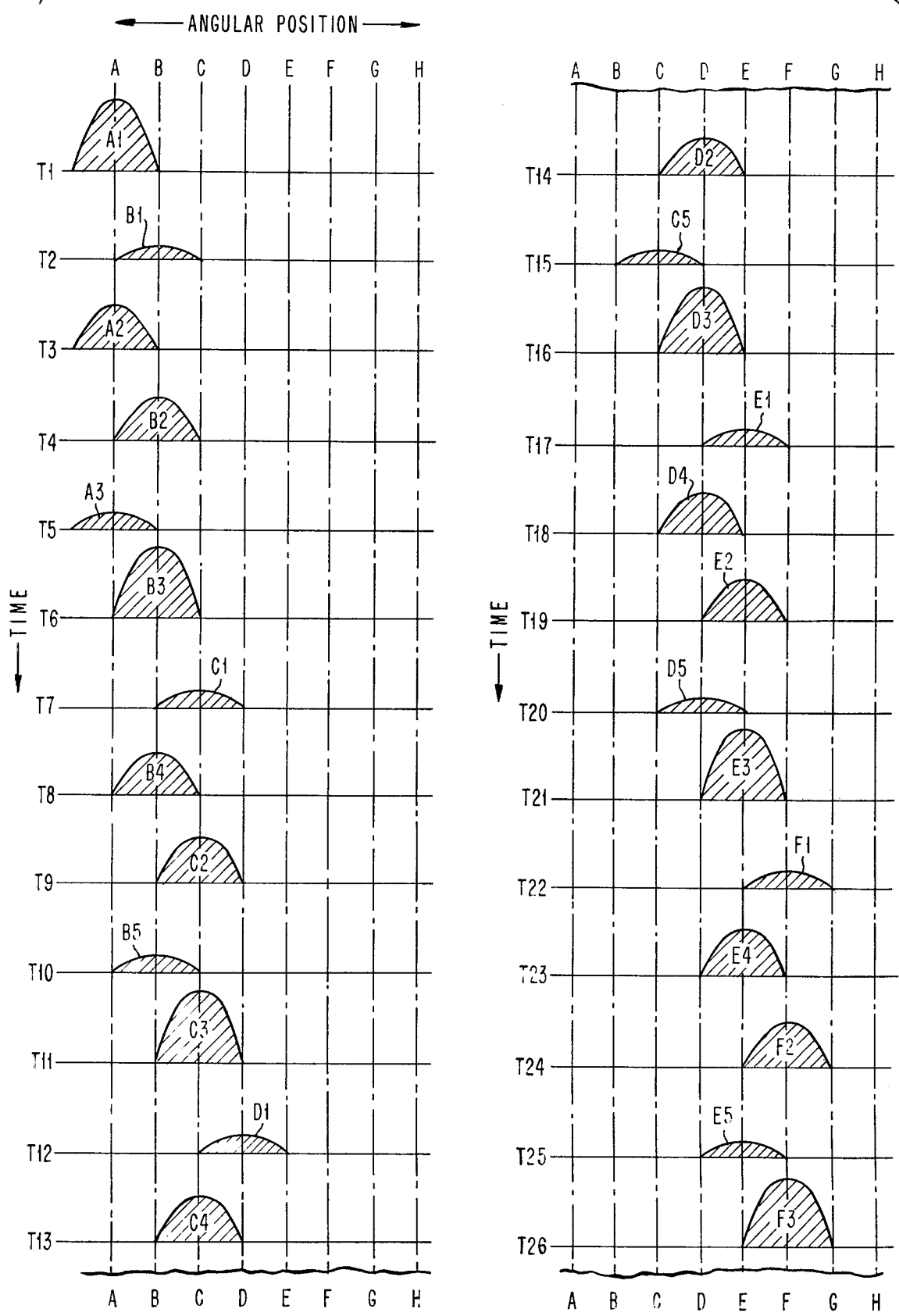
FIG. 1 is a diagrammatic representation of the sequence of signals which may be emitted from adjacent radio energy beam ports at successive time intervals to produce the resultant synthesized scanning beam.

Referring more particularly to FIG. 1, there is illustrated the principle of operation of the present invention, in a very simplified and elemental version thereof.

The vertical center lines labelled with the letters A–H in FIG. 1 represent different fixed beam port positions in accordance with polar coordinates. Thus, the different horizontal positions represent different angles of displacement from a common center position. Thus, each of the lettered center lines represents the angular position of the beam available from a single transmitter antenna port.

Arranged vertically downwardly from the upper left hand corner of FIG. 1, are representations of the beams actually radiated from the various beam ports at successive intervals of time which are respectively labelled T1, T2, T3, et seq. The beam energy radiated at each port is represented by a shaded beam outline associated with a particular time interval. Thus, at time T1, a high energy beam A1 is radiated from port A. At time T2, a low energy beam B1 is radiated from port B. At time T3, a medium energy beam A2 is radiated from port A, and at time T4, a medium energy beam B2 is radiated from port B. Next, a final low energy beam A3 is radiated from port A at T5, and then a high energy beam B3 is radiated from port B3 at time T6. At time T7, a low energy beam C1 is radiated from beam port C. The pattern then continues as illustrated for times T8–T13, and through times T14 et seq. as shown beginning at the upper right hand portion of FIG. 1. The individual beam port radiations are illustrated through time interval T26. For symmetrical completion of the series through port H, 36 time intervals are required. However, the last ten time intervals are not illustrated, since they simply continue the pattern which is fully illustrated for times T1 through T26.

In the sequences of illuminations of each individual port, the successive illuminations generally increase and then decrease in energy. Thus, referring to time intervals T2, T4, T6, T8, and T10, the successive illuminations of port B designated B1, B2, B3, B4, and B5 gradually increase from a low energy at B1 to a high energy at B3, and then again decrease to a low energy at B5. Each illumination of port B is interlaced with an illumination of an adjacent port. Thus, the order starting from time T2 is B1, A2, B2, A3, B3, C1, etc. As the energy levels of the successive illuminations of port B are increasing, the interlaced illuminations A2 and A3 of port A are decreasing in energy. Then, as the successive illuminations B3, B4, and B5 of port B are decreasing in energy, the successive interlaced illuminations C1, C2, and C3 of port C are increasing. It will be appreciated that by these patterns of interlaced illuminations of adjacent ports, and by the coordinated changes in radiation energy levels, there is an apparent substantially smooth movement of the resultant energy profile through the individual port angles, thus synthesizing a moving beam energy profile.

Because of the substantial overlap in the angular regions covered by the radiations from each port with adjacent port positions, the energy from the adjacent beam ports is additive in the overlap region. The sequence frequency, that is the switching frequency at which the individual bursts of carrier are initiated at the T1, T2, T3, etc. time intervals is relatively high in relation to the scanning movement of the resultant synthesized beam. Thus, the sequence of bursts of the radio frequency energy is switched to the different radiation beam ports at a switching frequency which is substantially greater than the rate of successive interception of the scanning beam to be synthesized with the individual radiation beam port positions. For instance, it might be said that the synthesized scanning beam intercepts port A at time T1, intercepts port B at time T6, and intercepts port C at time T11. This statement is at least approximately true since the maximum energy illuminations of those three ports occur on those respective time cycles. Thus, while the synthesized beam moves from an interception with port A to interception with port B, there are five switching steps T2 through T6.

As explained more fully below, the receiver used to receive the scanning beam information is preferably equipped with a low pass filter for the demodulated signals which has a cut-off point below the frequency of the switching frequency for the sequence of bursts of radio frequency energy. Thus, this filtering serves to cause the sequence of bursts of radio frequency energy, as demodulated, to blend together, and to provide what appears to be a beam which is scanning with a substantially smooth and uniform rate of movement. Because of the interlacing (alternations of illuminations from different ports) of the scan sequence steps T1, T2, etc., and because of the blending of the energy levels resultant from the beam illumination sequence, the present invention is sometimes referred to hereinafter as a "blended step scan". Thus, the blending of the energies of the successive beam port illuminations creates a resultant synthesized scanning beam.

The arrangement of eight beam ports A–H illustrated in FIG. 1 may be employed for azimuth guidance. With spacings between adjacent beam port center lines of 3.6 degrees, this provides a total scan range from the center line of the first port to the center line of the last port of 25.2 degrees.

For purposes of analysis, it is useful, though not essential, to characterize the sequence of switching of radio frequency energy from port to port as being divided into sub-sequences, and each sub-sequence may be associated with an increment of movement of the scanning beam. Thus, beam illuminations A1 and B1 at times T1 and T2 may be characterized as a first sub-sequence, A2-B2 as a second sub-sequence, A3-B3 as a third sub-sequence etc. Therefore, it may be said that each sub-sequence in the sequence illustrated in FIG. 1 consists of illuminations of each of two adjacent ports. A sub-sequence is generally defined as a succession of illuminations from different beam ports which provide a collective energy profile for a particular position of the synthesized scanning beam. While FIG. 1 is a simplified representation of the invention, employing only two beam port illuminations per sub-sequence, it is preferred that every sub-sequence should include the illumination of at least three beam ports, and perhaps four or more beam ports. By combining illuminations at modulated levels from three or four beam ports on each sub-sequence, a much improved synthesized scanning beam shape can be maintained.

The illumination of more than two beam ports in a particular sub-sequence makes more sense when it is appreciated that only the highest energy peak portions of the beams from the beam ports are illustrated in FIG. 1 in order to promote clarity. However, each beam available from each beam port is wider than illustrated in these drawings in the lower energy portions thereof. Thus, there is much more overlap in the lower energy portions of the beams than is illustrated in these drawings. Therefore, illumination of three or four or more beam port positions on each sub-sequence, at controlled modulation levels, can provide a composite synthesized scanning beam which comes very close to approximating a desired ideal beam shape.

Figure 2:
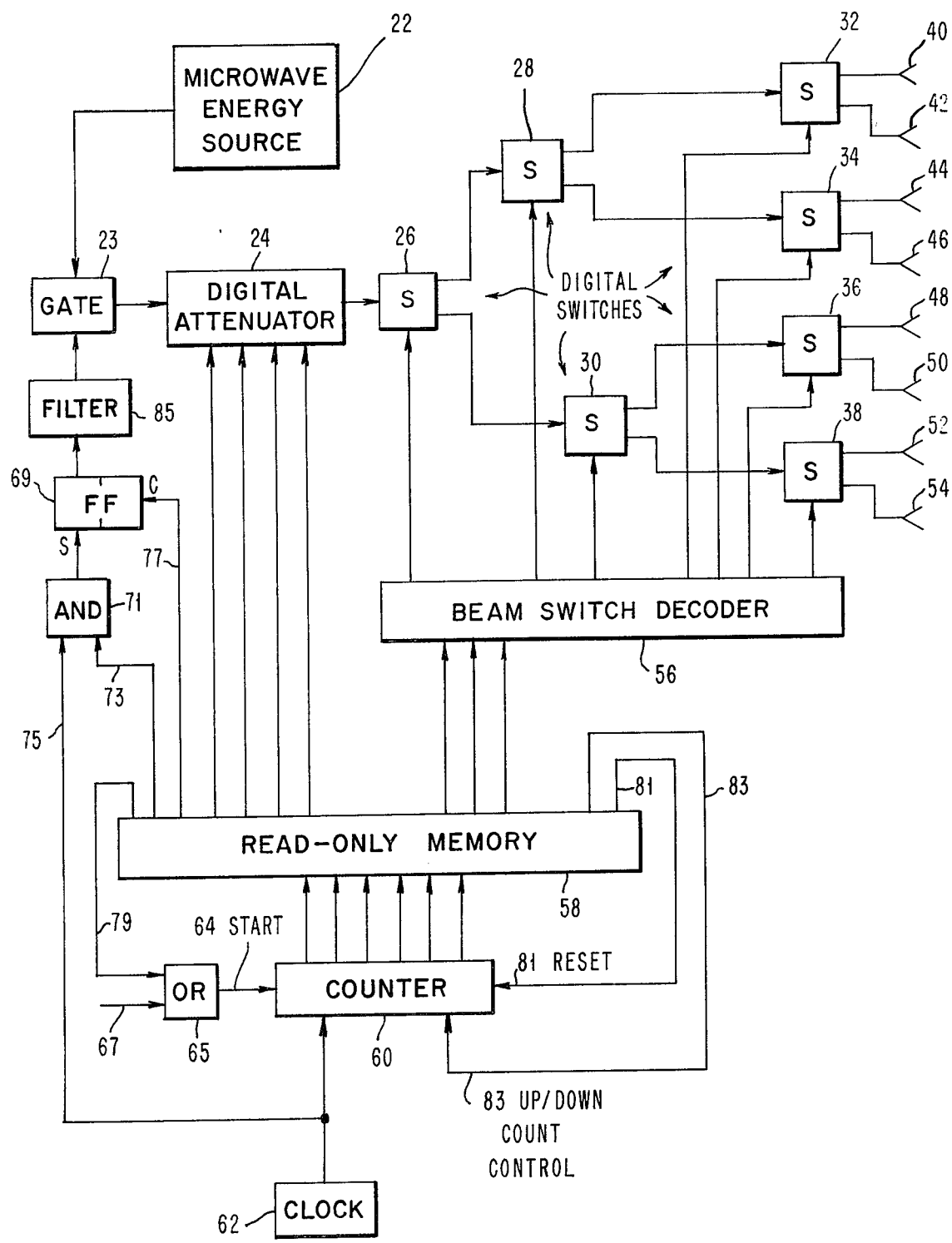
FIG. 2 is a schematic diagram of a transmitter for carrying out the invention.

FIG. 2 is a schematic representation of the organization of a transmitter for carrying out the present invention by transmitting signals such as described above in connection with FIG. 1. The transmitter includes a source 22 of microwave energy connected to supply such energy through a gating attenuator 23 and a digital attenuator 24, and then through a set of digital switches 26–38 to individual antenna elements 40–54. The digital switches 26–38 are connected for control by a beam switch decoder 56 so that the microwave energy is switched through to only one antenna element 40–54 at a time. Both the beam switch decoder 56, and the digital attenuator 24 are preferably controlled by different portions of individual digital words which are read from a read-only memory 58. The words selected to be read from the read-only memory 58 are selected in accordance with memory addresses supplied by a digital counter 60 which operates under the control of a system clock 62. The counter 60 may be started by a signal on a connection indicated at 64 which may be supplied through an OR gate 65 from a connection 67 from the master control of a larger system of which the present transmitter system forms a part, or to a manual "start" switch.

The microwave energy source 22 is preferably operable in the C-band within a range of frequencies allocated for navigation signals. The digital attenuator 24 is operable in accordance with a portion of the digital word read from the read-only memory 58 to provide various selected values of attenuation of the microwave energy, as required by the predetermined program of sequential illuminations of the various beam ports. The microwave energy is steered from the digital attenuator 24 through each tier of digital switches to the one antenna element selected by the portion of the memory word read from the read-only memory 58 to the beam switch decoder 56. Thus, when the control connections from the beam switch decoder 56 to the respective digital switches 26, 28, and 32 are such as to switch the microwave energy to the upper output of each of these digital switches, the result is that the microwave energy is ultimately delivered to antenna element 40. In a similar manner, switch 26, and one of the switches 28 and 30, and one of the third tier switches 32–38 are always operated to select one of the eight antenna elements 40–54 for the radiation of a burst of the microwave energy. In coordination with this beam switching, for each burst of energy, a particular attenuation value is selected for the attenuator 24 by the portion of the data word read from the read-only memory and supplied to that digital attenuator. Thus, by this means, the correct attenuation is selected in conjunction with the selection of the correct beam port.

In order to precisely gate the energy through the digital attenuator 24 at a time immediately after all of the control voltages have been applied by the read-only memory 58 and the beam switch decoder 56 to the digital attenuator 24 and the switches 26–38, the timing gate attenuator 23 is provided. Gate attenuator 23 is controlled through a filter 85 by a flip-flop 69, which is switched to the "set" condition by an AND gate 71 upon the coincidence of an appropriate read-only memory signal at connection 73 with a clock signal on connection 75 from system clock 62. The end of the burst of energy is determined by closing the gate attenuator 23 by clearing the flip-flop 69 from a signal supplied on connection 77 from the read-only memory 58. The gate attenuator is preferably a linear attenuator, and the filter 85 imparts a desirable rise and fall characteristic to the control signal so that each gated pulse or burst of energy has a desirable characteristic, which may approach a cosine squared characteristic, for instance.

The system may also be controlled automatically by restarting the counter 60, by a start signal emitted from the read-only memory 58 at connection 79. Control signals may also be provided at connections 81 and 83 from the read-only memory 58 for respectively resetting the counter 60 and controlling whether the counter counts up or down. Thus, the to and fro scans of the scanning beam may be synthesized by first having the counter 60 count up for the "to" scan, and then having the counter count down for the "fro" scan. Furthermore, in the to and fro scan mode, there is typically substantial time gap between the end of the to scan and the beginning of the fro scan. This time interval can also be provided by the operation of read-only memory 58 by programming the required number of timing intervals when the gate 23 simply is not opened to permit the transmission of any energy bursts.

In the above description, the energy of each burst of carrier frequency is modulated by the digital attenuator 24. This attenuator accomplishes an energy modulation by modulating the amplitude of the transmitted carrier. This is the preferred means for accomplishing the energy modulation of each burst of carrier. However, it will be understood that it is also possible to modulate each burst of carrier frequency energy by controlling the duration of each burst of energy. Thus, a higher energy is transmitted if the energy is transmitted for a longer burst interval, and less energy is transmitted if the burst interval is reduced. This mode of modulation is referred to as pulse duration modulation. Either form of energy modulation may be employed.

Figure 3:
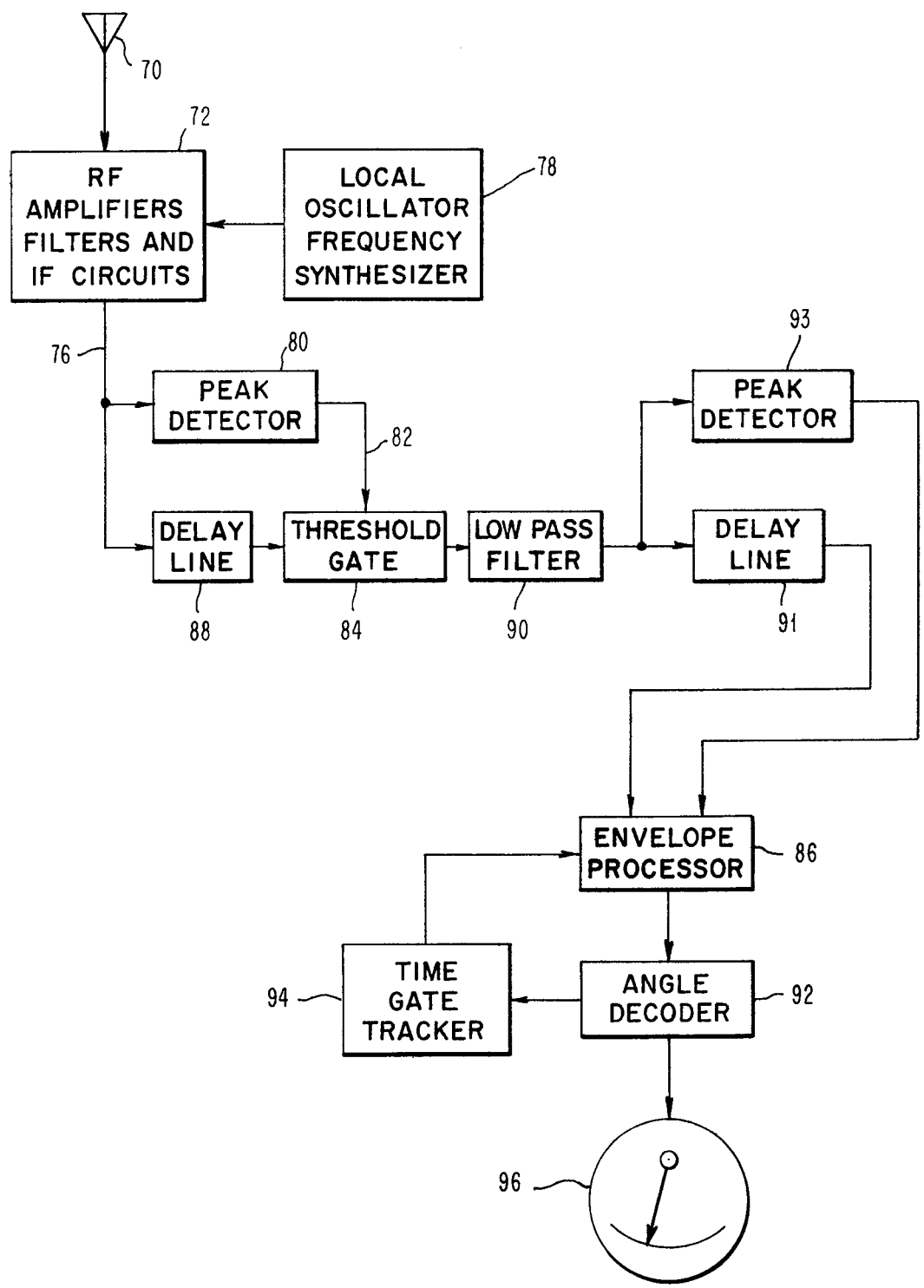
FIG. 3 is a schematic diagram illustrating a receiver used for carrying out the invention.

FIG. 3 is a schematic diagram of a receiver for carrying out the present invention, with particular emphasis on the parts of the receiver that are pertinent to the present invention.

The receiver includes an antenna schematically shown at 70 which receives the scanning beam signals. Antenna 70 supplies those signals to the early stages of the receiver indicated at 72, which include radio frequency amplifiers, filters, and intermediate frequency circuits. These circuits amplify the received signals, filter out unwanted adjacent signals, and convert the microwave signal to a "video" signal at connection 76. A local oscillator frequency synthesizer is provided, as indicated at 78, which supplies suitable local oscillator frequencies to the mixers within 72 for accomplishing the frequency conversions.

While the present invention relates generally to the production of synthesized scanning beams, the receiver of FIG. 3 is particularly adapted for receiving and processing scanning beams in the "to" and "fro" mode. The amplitude of the peak of the received energy, as indicated by the video signal on connection 76, is detected by a peak detector circuit indicated at 80, and the resultant output at connection 82 from peak detector 80 is used to set threshold gate circuit 84.

The video signal is then supplied from connection 76 through a delay line 88, the threshold gate 84, a low pass filter 90, and a second delay line 91 to the envelope processor 86. The envelope processer 86 is operable in cooperation with an angle decoder circuit 92, and a time gate tracker circuit 94 to determine the angular bearing of the receiver with respect to the transmitter, and to indicate the bearing angle on an indicator 96.

Because of the delay line 88, the threshold gate 84 is fully set and ready to process each received pulse of energy on the basis of the peak detector measurement of the highest peak of a preceding group of energy pulses.

The threshold gate 84 is preferably designed to reject all energy pulses which are at an energy level more than 10 decibels below the peak level as determined by the measurement of peak detector 80. This provides the advantage of discarding low amplitude portions of the synthesized scanning beam. This means that the synthesis of the scanning beam can have substantial imperfections below the minus 10 decibels level without affecting the accuracy of the system. The rejection of the signal components below the minus 10 decibel level also provides the advantage of discriminating against spurious signals which may arise because of reflections, etc., and which are sometimes referred to as "multipath" signals.

The "clean" signal pulse, which has been cleansed of all components more than 10 decibels down from the peak, is then smoothed by passage through the low pass filter 90 and supplied to the envelope processor 86. Filter 90 is preferably a linear phase filter, such as a Bessel function filter. The envelope processor 86 precisely determines when the "to" and "fro" beams scan by the aircraft. The resultant signals are supplied to the angle decoder 92 which determines the azimuth or elevation angle based upon the time interval between the "to" and "fro" scans. Such angle determination signals then appear on the output of the angle decoder 92, and are indicated on the angle indicator 96. The time gate tracker circuit 94, which is connected between the angle decoder 92 and the envelope processor 86, designates which of the to and fro scans are to be processed. The detection of the timing of passage of the to and fro scan pulses is preferably carried out by detecting, in the envelope processor 86, the leading and trailing edges of each energy pulse, as determined at an energy level 4 decibels down from the peak. That energy level is determined within the envelope processor 86 on the basis of a measurement of the energy peak of the filtered scan pulse by a second peak detector 93.

The peak detectors 80 and 93 each have a relatively long memory in terms of measuring and retaining a measurement of the peak energy received in an entire "to" and "fro" scan interval. This memory feature may be carried out in a number of conventional ways. For instance, each peak detector may include a capacitor which is charged to the peak voltage level, and a high resistance charge leakage resistor which provides for dissipation of the charge over an interval which is fairly long in relation to the scan interval. That is the preferred arrangement. However, it is also a workable alternative to simply omit the leakage resistor, and to provide a timed discharge switch to discharge the capacitor at intervals corresponding to the end of a to or fro scan.

Since the peak detector 80 and the threshold 84 "look" at the unfiltered demodulated received pulses, it will be appreciated that entire pulses are discarded by gate 84 if they are below the minus 10 decibel level. Thus, only the strongest component pulses are passed on to the low-pass filter to be integrated into the composite energy profile which is seen by the envelope processor. Then, because of the operation of peak detector 93, and the envelope processor, in looking only at the minus four decibel levels of the composite energy pulse, it is only the substantial peak of the energy that is actually relied upon in the receiver.

Any delays and asymmetries introduced by the low-pass filter 90 are cancelled out by the "to" and "fro" scan because both scans are delayed, or otherwise affected by the filter, in the same way for both scans, without changing the interval between scans.

The receiver, as just described, is quite capable, without any modification whatever, of receiving and processing to and fro mode scanning beam signals which are produced by means other than the scanning beam synthesis of the present invention. Thus, the receiver can process beams that are scanned by mechanically movable antenna structures, or by simultaneously fed beam ports having a common phase center. The receiver is substantially the same as prior receivers proposed for prior scanning beam systems, with the exception of the provision of the additional threshold gate 84.

The threshold gate 84 is not believed to be absolutely essential in the practice of the present invention; however it is believed to be very desirable because of the rejection of low amplitude noise signals, and low amplitude signals which may represent imperfections in the synthesis of the scanning beam.

It will be appreciated that the principles of the present invention may be applied to systems operating in different modes, at different frequencies, and for purposes other than those specifically disclosed. However, without intending to limit the scope of the invention, in order to more fully exemplify a preferred embodiment of the invention, particular frequencies, scan rates, and other circuit and operating constants are given below for the preferred embodiment.

As previously mentioned above, the arrangement of eight beam ports illustrated in FIGS. 1 and 2 may be employed for azimuth guidance, with spacings between adjacent beam port center lines of 3.6 degrees. This provides a total scan range from the center line of the first port to the center line of the last port of 25.2 degrees. In the preferred embodiment, the microwave carrier frequency is in C band, just above 5,000 Khz. The scanning speed of the synthesized scanning beam is 50 microseconds per degree (or 20,000 degrees per second). Four ports are illuminated for each sub-sequence of illuminations. The switching interval, for each burst of carrier energy from each port is approximately 20 microseconds. The switching frequency of the bursts of radio frequency energy is then 50 KHz, and the frequency of recurrence of sub-sequences of four illuminations each is 12.5 KHz. The low pass filter 90 in the receiver of FIG. 3 is designed with an upper cut off frequency well below 12.5 KHz, such as at 5 KHz.

The synthesized scanning beam preferably has a beam width, as measured at the minus 3 decibels level of 6°.

By employing the techniques of the present invention, it is possible to synthesize a scanning beam signal which appears to arise from a beam having a width of, for instance, 6° from beam ports which radiate component beams which are narrower than 6° in width. Such a result is obtained by simply adjusting the program of beam port illuminations in synthesizing the scanning beam. Furthermore, the component beam ports may be designed to produce component beams which are not of uniform width, but a uniform width synthesized scanning beam signal may nevertheless be produced by suitable adjustments in the program of beam port illuminations. Thus, the method of synthesis of scanning beams in accordance with the present invention is very flexible. Because of this flexibility, the method sometimes may be adapted to existing antenna structures not designed initially for practice of the method of this invention.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A method of synthesizing a continuous scanning beam of radio energy from an array of fixed antenna elements having radiation beam ports aimed radially outwardly to different angles in the arc over which the scanning beam is to be scanned, comprising
    rapidly switching the radio frequency energy from a transmitter in a repeating sequence of bursts of radio frequency energy to illuminate the different ones of the radiation beam ports at a switching frequency which is substantially greater than the rate of successive interception of the scanning beam to by synthesized with the individual radiation beam port positions,
    and modulating the energy levels of the individual bursts of radio frequency energy in a predetermined program to provide a composite beam energy profile which is a synthesized directional beam which is moving at a predetermined desired scanning rate.

2. A method as claimed in claim 1 wherein
    the sequence of bursts of radio frequency energy is divided into sub-sequences,
    each sub-sequence including bursts from each member of a group of beam ports,
    successive sub-sequences being shifted to beam port groups including different beam port group members as the synthesized scanning beam progresses across the array of beam ports.

3. A method as claimed in claim 1 wherein
    the sequence of bursts of radio frequency energy is divided into sub-sequences,
    and each sub-sequence includes at least three successive bursts from separate beam ports from an array including more than three beam ports.

4. A method as claimed in claim 3 wherein
    the individual bursts of radio frequency energy are switched to different radiation beam ports in different order on successive sub-sequences.

5. A method as claimed in claim 1 wherein
    the successive illuminations of each beam port are modulated to individual values in accordance with a pre-determined program which generally provides a series of successive values which increase and then decrease in energy.

6. A method as claimed in claim 5 wherein
    the successive illuminations of each beam port are interlaced with illumination from at least one adjacent beam port to provide said composite beam energy profile.

7. A method as claimed in claim 1 including
    a method of receiving and utilizing the synthesized scanning beam including the steps of receiving and demodulating and filtering said bursts of radio frequency energy,
    said filtering including the exclusion from the demodulated signals of all frequencies above a predetermined frequency,
    said predetermined frequency being below said switching frequency at which said radiation beam ports are illuminated.

8. A method as claimed in claim 7 including the step of
    detecting the peak energy level of the composite beam energy profile as received by the receiver.
    and using that peak energy measurement as a basis for excluding signal components which are more than a predetermined threshold level below the energy peak prior to said filtering at said predetermined frequency.

9. A method as claimed in claim 1 wherein
    the modulation of the energy levels of the individual bursts of radio frequency energy is carried out by modulation of the amplitude of each individual burst of the energy.

10. A method as claimed in claim 1 wherein
    the modulation of the energy level of the individual bursts of radio frequency energy is carried out by controlling the duration of each individual burst of radio frequency energy.

11. Apparatus for synthesizing a continuous scanning beam of radio energy comprising
    an array of fixed antenna elements providing radiation beam ports aimed radially outwardly to different angles in an arc over which the scanning beam is to be scanned,
    a source of microwave radio frequency energy,
    switching means connected between said energy source and said antenna elements and operable for rapidly switching the radio frequency energy in a repeating sequence of bursts of energy to illuminate the different ones of the radiation beam ports at a switching frequency which is substantially greater than the rate of successive interception of the scanning beam to be synthesized with the individual radiation beam port positions,
    and means connected for modulating the energy levels of the individual bursts of radio frequency energy in a predetermined program to provide a composite beam energy profile which is a synthesized directional beam which is moving at a predetermined desired scanning rate.

12. Apparatus as claimed in claim 11 wherein
    said modulating means is operable to modulate successive illuminations of each beam port in accordance with a predetermined program which generally provides a series of successive values which increase and then decrease in energy.

13. Apparatus as claimed in claim 12 wherein
    said switching means is operable to provide successive illuminations of each beam port in alternation with illuminations from at least one adjacent beam port to provide for interlacing of different beam port illuminations in the production of the composite beam energy profile.

14. Apparatus as claimed in claim 11 wherein
    said modulation means comprises an amplitude modulator.

15. Apparatus as claimed in claim 11 wherein
    said modulating means comprises a times gate operable as a pulse duration modulator.

16. Apparatus as claimed in claim 14 wherein said amplitude modulator comprises a digital attenuator.

17. Apparatus as claimed in claim 11 wherein
said switching means and said modulating means are controlled by a common control and timing means including a system clock.

18. Apparatus as claimed in claim 17 wherein
said common control means includes a digital read-only memory for emitting digital control data words in sequence for accomplishing the switching and modulating functions.

19. Apparatus as claimed in claim 18 including
an address counter connected to said read-only memory for sequentially reading different addressed program words from said read-only memory for providing the desired switching and attenuating functions,
said address counter being connected to receive clock signals from said system clock for advancing the counter.

20. Apparatus as claimed in claim 19 which is especially adapted for "to" and "fro" scanning and wherein
said counter is a reversible counter which is counted in one direction to generate the synthesized scanning beam in the "to" direction,
and which is then reversed to count in the other direction for synthesis of the scanning beam in the "fro" direction.

21. Apparatus as claimed in claim 19 wherein
said switching means includes a beam switch decoder connected to receive digital information from said read-only memory,
and a plurality of digital branching switches connected to receive control signals from the said beam switch decoder,
said beam switch decoder being operable to convert a portion of each data word read from said read-only memory into the appropriate beam switching control signals for said digital switches to switch the radio energy to the selected antenna ports.

22. Apparatus as claimed in claim 19 wherein
said modulation means comprises an amplitude modulator,
said amplitude modulator comprising a digital attenuator,
and said digital attenuator being connected to receive a portion of each data word read from said read-only memory and to provide an attenuation in accordance with the data signals represented by said portion of said data word.

23. Apparatus as claimed in claim 18 wherein
said switching means includes a tree arrangement of switches connected between said source of microwave radio frequency energy and said antenna ports for directing the energy to the selected antenna ports.

24. Apparatus as claimed in claim 23 wherein
said switching means includes a gating means connected between said source of microwave radio frequency energy and said switching tree for precisely gating the radio frequency energy through the switching tree after the switches of the switching tree have been set for each burst of energy from each antenna port.

25. Apparatus as claimed in claim 24 wherein
said gating means comprises a linear attenuator,
and wherein there is provided means for controlling said linear attenuator to provide a predetermined desired rise and fall characteristic in the burst of radio frequency energy for each antenna port.

26. A method as claimed in claim 6 wherein
the switching of the radio frequency energy follows a program which synthesizes a beam which first scans in a "to" direction,
and then synthesizes a beam which is reversed to scan in the "fro" direction.

27. A method as claimed in claim 8 wherein
the switching of the radio frequency energy follows a program which synthesizes a beam which first scans in a "to" direction,
and then synthesizes a beam which is reversed to scan in the "fro" direction,
and including the steps of detecting the "to" and "fro" scans in the receiver and measuring the time interval between the reception of the respective "to" and "fro" scans to thereby measure the angular bearing of the receiver with respect to the transmitter.

* * * * *

UNITED STATES PATENT AND TRADEMARK OFFICE
CERTIFICATE OF CORRECTION

PATENT NO. : 4,050,074
DATED : September 20, 1977
INVENTOR(S) : Donald J. Toman

It is certified that error appears in the above-identified patent and that said Letters Patent are hereby corrected as shown below:

Column 6, lines 17 and 18, "typically substantial" should read --typically a substantial--.

Column 9, line 27, "by" should read --be--;
line 61, "illumination" should read --illuminations--.

Column 10, line 66, "times" should read --timed--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks